May 23, 1950     M. E. BLAIN     2,508,366
RADIO COMPASS DEMONSTRATOR

Filed Aug. 8, 1946     3 Sheets-Sheet 1

INVENTOR.
MARSHALL E. BLAIN
BY *Wade Kountz* AND
*Frederick W. Cotterman*
ATTORNEYS May 23, 1950 M. E. BLAIN 2,508,366
RADIO COMPASS DEMONSTRATOR
Filed Aug. 8, 1946 3 Sheets-Sheet 3

INVENTOR.
MARSHALL E. BLAIN
BY Wade Koontz AND
Frederick W. Cotterman
ATTORNEYS

Patented May 23, 1950

2,508,366

UNITED STATES PATENT OFFICE 2,508,366

RADIO COMPASS DEMONSTRATOR

Marshall Edward Blain, Memphis, Tenn.

Application August 8, 1946, Serial No. 689,135

5 Claims. (Cl. 35—10.2)

(Granted under the act of March 3, 1883, as amended April 30, 1928; 370 O. G. 757)

The invention described herein may be manufactured and used by or for the Government for governmental purposes without the payment of any royalty thereon.

This invention relates to a training or demonstrating device and more particularly to a device for assisting an instructor in explaining to a trainee the use of a radio compass.

An object of the invention is to provide a device which will simulate such conditions as may be encountered in actual flight, whereby adjustments which may be required to be made in flight may be set up by the student and quickly checked by the instructor to determine the student's understanding of the subject, whereby errors may be detected and pointed out and corrected in minimum time.

Another object of the invention is to provide a device which will simulate a radio compass and demonstrate its use by aural as well as visual means.

Further objects and advantages will be recognized as the invention is described in detail and reference is had to the drawing, wherein.

Like reference characters refer to like parts throughout the several views.

Figure 1:
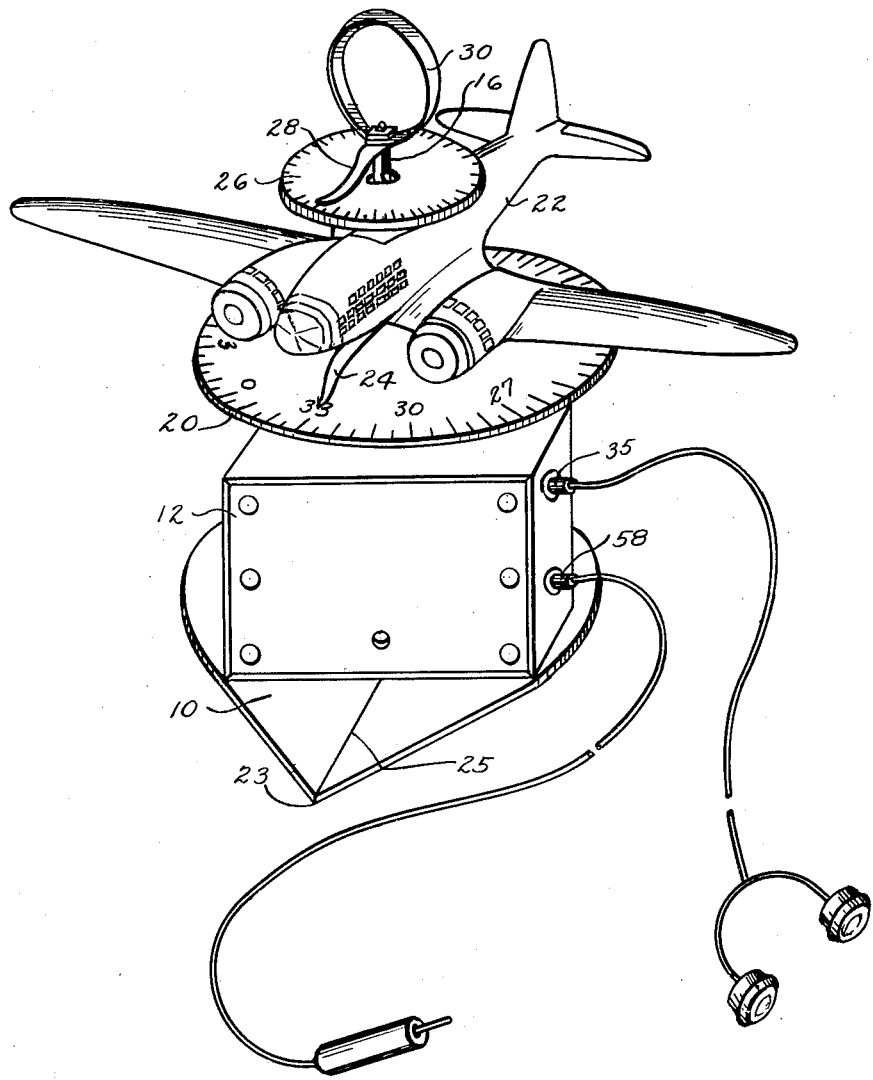
Fig. 1 is a perspective view of my radio compass demonstrator.

The base 10 and housing 12 constitute the framework of the device. The upper side of the housing is provided with a bearing hub 14 within which a vertical shaft 16 is rotatable. The bearing hub 14 has a reduced upper end 18 upon which a visual representation of a magnetic compass card 20 is rotatable.

The vertical shaft 16 extends above the hub part 18 and a miniature airplane 22 is mounted thereon. There is enough friction between the airplane and the shaft to cause them to turn together when one is rotated. A pointer 24 has one end fast to the bottom of the plane 22 and the other end pointing to the graduations on the compass card 20. The pointer 24 corresponds to the lubber line on the magnetic compass case which also turns with the plane. The base 10 is brought to a point as at 23 and has a line 25 which, in operation, is pointed to an imaginary radio station 27 from which the simulated signal is assumed to be coming. The pointer 24 may be referred to as the base station pointer and the line 25 as the base station pointer line.

Fixed to the top of the airplane 22 and concentric with the shaft 16 is a pilot's bearing indicator in the form of an azimuth scale 26 graduated to 360° with 0° and 180° fore and aft, respectively, on the axis of the plane. A pointer 28 extends from the upper end of the shaft 16, the free end of the pointer being adapted to register with the graduations on the azimuth scale 26. The pointer 28 may be referred to as the pilot's bearing indicator needle.

A ring 30 made in representation of a loop antenna is fast on the upper end of the shaft 16 for coincident rotation therewith. The plane of the loop 30 is at right angles to the plane of the bearing indicator needle 28.

Mounted within the housing 12 on the lower end of the shaft 16 to rotate in unison therewith is a disc 32 which carries the collector ring 34 which is insulated from the disc by the ring of insulation 36. A power outlet jack 35 has its outer contact 38 grounded to the housing and its center contact 40 bearing on a spring 42 which holds a brush 44 against the collector ring 34. The inner contact 40 and brush 44 are separated from the outer contact 38 and housing 12 by an insulating bushing 39. The two contacts 38—40 of the jack 35 may be electrically connected to head phones 33 or other electro-acoustical transducer in the usual manner. A pair of secondary coils 46 within a casing 48 are connected, one end to the ring 34 and the other end to ground. The manner in which the coils 46 are mounted causes them to swing about the axis of the shaft 16 when the loop 30 is turned.

Figure 2:
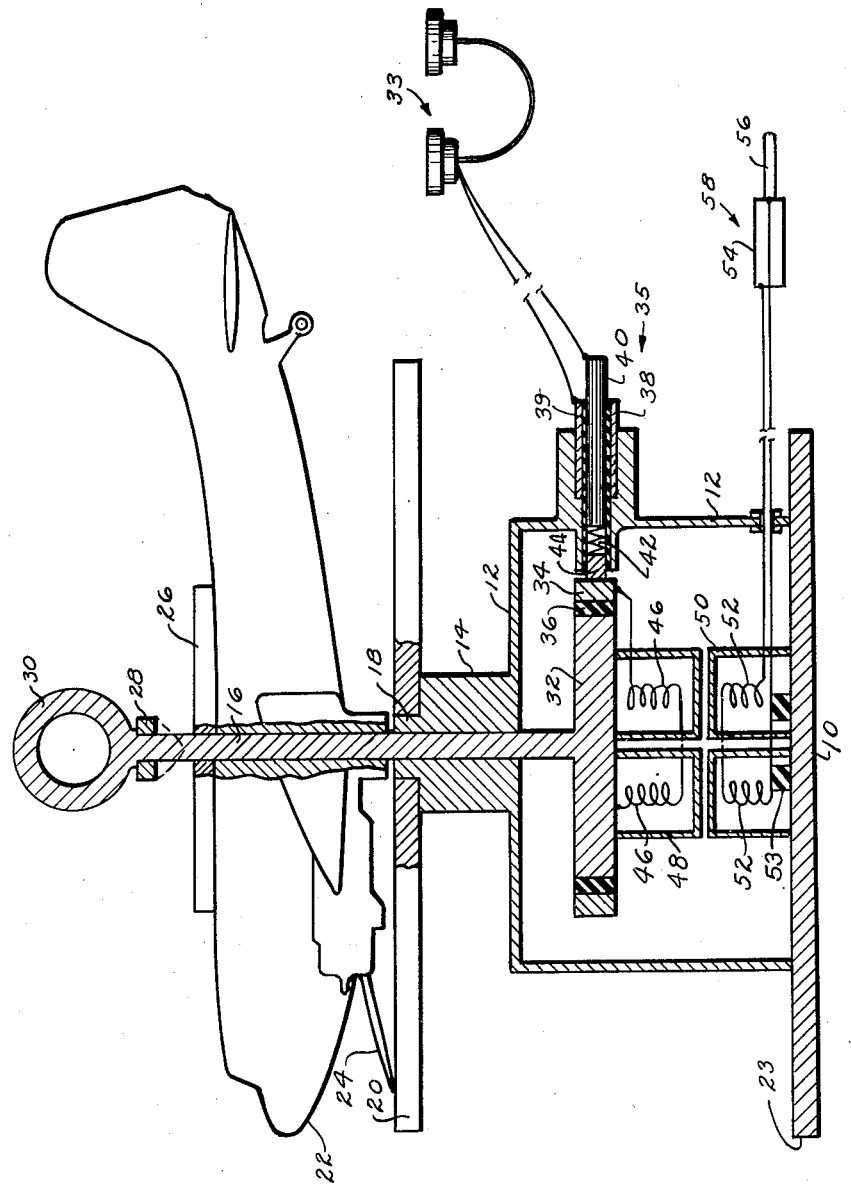
Fig. 2 is a schematic vertical axial section through the device.

Mounted within the housing 12 on the base 10 is a casing 50 containing a pair of connected primary coils 52 supported on insulators 53, the ends of the coils being connected to the terminals 54 and 56 of a power inlet jack 58. When the loop 30 is turned so that the plane of the loop coincides with the line 25 on the base 10, the axes of the coils 46 and 52 will coincide as in Fig. 2, and maximum inductance will be had. Minimum inductance or null will be effected when the plane of the loop 30 is normal to the base station pointer line 25.

The operation of the device is as follows:

The power inlet jack 58 may be plugged into a Link trainer radio chassis or into any other connection from which a signal may be received. The base station pointer 23 and line 25 should be placed so that the line and pointer will be directed toward an imaginary radio station as at 27, Fig. 3, from which the simulated signal is assumed to be coming. If the device is being placed on a radio compass chart, the pointer 23 and line 25 may be placed on one of the radial lines which converge on the station.

Figure 3:
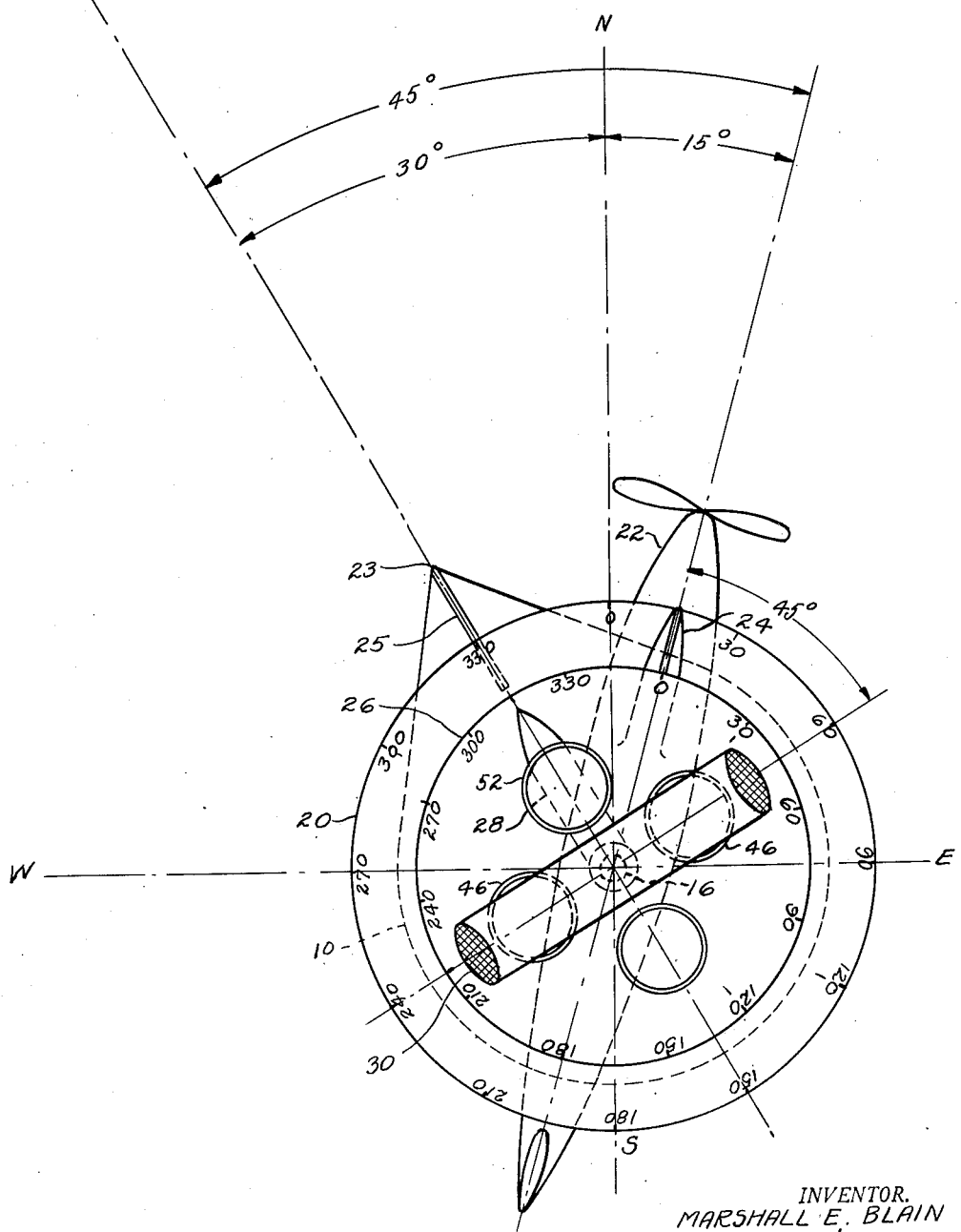
Fig. 3 is a schematic top plan view of the device.

To simulate the function of the conventional magnets of a magnetic compass, the magnetic compass card 20 may be manually turned so that 0 on the card points to north (see diagram Fig. 3). The loop 30 is now turned until the axes of the coils 46 are spaced 90 degrees from the axes of the coils 52 at which point the minimum or null signal will be heard on the head set which is connected to the jack 35. This signal will be heard whenever the loop pointer 28 points to the station with which the line 25 is aligned regardless of the heading of the aircraft. In the drawing, Fig. 3, the radio compass bearing selected for illustration is 330 degrees and the heading is 15 degrees.

Having described my invention, I claim:

1. A device for teaching the use of a radio compass, which consists of a base, a pointer line on said base adapted to be pointed toward an imaginary radio station, a housing on said base, a hub on the top of said housing having a reduced portion at its upper end, a vertical shaft rotatable in said hub and extending upwardly therethrough and downwardly into said housing, a simulation of a magnetic compass card rotatable on said reduced portion, a miniature airplane frictionally mounted on the upwardly extending end of said shaft, a pointer fixed on the bottom of said airplane for registering with the indicia on said card, an azimuth scale fixed on the upper side of said airplane, a bearing indicator needle having one end fixed to said shaft and the free end adapted to register with the graduations of said azimuth scale, a ring for simulating a loop antenna fast on the upper end of said shaft, a disc on the lower end of said shaft, a collector ring insulatedly fixed on said disc, a brush insulatedly carried on said housing and having contact with said collector ring, a phone-jack having its inner terminal in electrical contact with said brush and its outer terminal grounded on said housing, a pair of connected primary coils insulatedly carried on said base within said housing having their axes spaced apart but parallel to the shaft axis and in the plane of the base station pointer line, means electrically connecting the ends of said primary coils to a signal source, a pair of connected secondary coils carried on said disc with one end grounded on said disc and the other end electrically connected to said collector ring, said secondary coils being coaxial with said primary coils when the plane of the loop coincides with the plane of the base station pointer line, a headset, and means electrically connecting the terminal of said phone-jack to said headset.

2. A device for teaching the use of a radio compass, which consists of a base, a pointer line on said base adapted to be pointed toward an imaginary radio station, a housing on said base, a vertical shaft rotatably supported in said housing and extending from within said housing upwardly and therethrough, a simulation of a magnetic compass card rotatable about the axis of said shaft above said housing, a miniature airplane frictionally mounted on the upwardly extending end of said shaft, a pointer fixed on the bottom of said airplane for registry with the indicia on said card, an azimuth scale fixed on said airplane, a bearing indicator needle having one end fixed to said shaft and the free end adapted to register with the graduation of said azimuth scale, a ring for simulating a loop antenna fast on the upper end of said shaft, a collector ring insulatedly carried on an enlarged portion at the lower end of said shaft, a phone-jack having its inner terminal electrically connected to said collector ring and its outer terminal grounded on said housing, a primary winding insulatedly carried on said base with axis fixed with respect to the station pointer line, means electrically connecting the ends of said primary winding to a signal source, a secondary winding carried on said enlarged portion with one end grounded on said enlarged portion and the other end electrically connected to said collector ring, said secondary winding having an axis in the same plane as that of the primary winding when the plane of the loop coincides with the plane of the base station pointer line, a headset, and means electrically connecting the terminal of said phone-jack to said headset.

3. A device for teaching the use of a radio compass, which consists of a framework, a line on said framework adapted to be pointed toward an imaginary radio station, a shaft bearing in said framework, a vertical shaft rotatably supported in said shaft bearing and extending upwardly and downwardly from said bearing, a simulation of a rotatable magnetic compass card coaxed with said shaft, a miniature airplane frictionally mounted on the upwardly extending end of said shaft, a pointer fixed on the bottom of said airplane for registry with the indicia on said card, an azimuth scale fixed on said airplane, a bearing indicator needle having one end fixed to said shaft and the free end adapted to register with the graduation of said azimuth scale, a ring for simulating a loop antenna fast on the upper end of said shaft, a collector ring insulatedly carried on said shaft below said shaft bearing, a phone-jack having one terminal in electrical communication with said ring and the other terminal grounded on said framework, a primary inductance insulatedly affixed to said framework, means electrically connecting the ends of said primary inductance to a signal source, a secondary inductance supported for coincident rotation with said shaft with one end in electrical communication with said framework and the other end electrically connected to said collector ring, said secondary inductance having an axis in the same plane as an axis of the primary inductance when the plane of the loop coincides with the plane of the framework line, a headset, and means electrically connecting the terminal of said phone-jack to said headset.

4. A device for teaching the use of a radio compass, which consists of a framework, a line on said framework adapted to be pointed toward an imaginary radio station, a vertical shaft rotatably supported by said framework, a miniature airplane frictionally mounted on an upwardly extending end of said shaft, an azimuth scale fixed on said airplane, a bearing indicator needle having one end fixed to said shaft and the free end adapted to register with the graduations of said azimuth scale, a ring for simulating a loop antenna fast on said shaft, a primary inductance insulatedly carried on said framework, means electrically connecting said primary inductance to a signal source, a secondary inductance supported on said shaft to rotate therewith, said primary and secondary inductances being so positioned with respect to each other that maximum inductance is had when the plane of the loop coincides with the plane of the base station pointer line, a headset, and means electrically connecting the terminal of said secondary inductance to said headset.

5. In a device for teaching the use of a radio compass, a framework, a line on said framework adapted to be pointed toward an imaginary radio base station, a shaft rotatably supported by said framework, a ring for simulating a loop antenna and a disc both fast on said shaft to rotate therewith, a secondary winding comprising a pair of secondary coils carried on said disc, said coils having their several axes one hundred eighty degrees apart, parallel with, and equidistant from the shaft axis and in the plane of the loop, a primary winding compressing a pair of primary coils insulatedly and nonrotatably supported on the framework also having their several axes one hundred eighty degrees apart, parallel with, and equidistant from the shaft axis and in the plane of the base station pointer line, conducting means adapted for connecting the ends of said primary winding to an electric current source, a collector ring insulatedly supported on said disc, one end of said secondary winding being grounded to said framework and the other end connected to said collector ring, a brush yieldably held against said collector ring and conducting means joining said brush and said framework to an electro-acoustical transducer.

MARSHALL EDWARD BLAIN.

REFERENCES CITED

The following references are of record in the file of this patent:

UNITED STATES PATENTS

| Number | Name | Date |
| --- | --- | --- |
| 2,321,799 | Cone, Jr., et al. | June 15, 1943 |
| 2,326,764 | Crane | Aug. 17, 1943 |
| 2,333,933 | Horr | Nov. 9, 1943 |
| 2,346,693 | Lyman | Apr. 18, 1944 |
| 2,366,603 | Dehmel | Jan. 2, 1945 |
| 2,402,271 | Andrews | June 18, 1946 |
| 2,404,386 | Levine | July 23, 1946 |
| 2,418,834 | Hartman | Apr. 15, 1947 |
| 2,450,240 | Kail | Sept. 28, 1948 |